HYDRAZONE STABILIZED PLASTIC FILM

Walter C. Warner and Elbert E. Gruber, Cuyahoga Falls, Ohio, assignors to The General Tire and Rubber Company, Akron, Ohio, a corporation of Ohio No Drawing. Application April 14, 1953,
Serial No. 348,804

10 Claims. (Cl. 260—45.5)

This present invention relates to the stabilization of film-forming vinyl, vinylene, and vinylidene compounds such as polyvinyl chloride, polyvinylidene chloride and the like. It particularly relates to an additive for such compounds which inhibits and minimizes stiffening and discoloration of the compounds on prolonged exposure to light, aging, and weathering.

At the present time, most polyvinyl chloride and polyvinylidene chloride material is plasticized with monomeric plasticizers to give flexible and pliable films and sheets. The monomeric plasticizers employed are liquids such as dioctyl phthalate, tricresyl phosphate and the like and are relatively volatile materials of low molecular weight. When mixed with vinyl compounds, these monomeric liquids tend to bleed and evaporate out of the polymer and in time the polymer becomes stiff and rigid. Since various additives can be employed to stabilize these polymers and otherwise improve them, the principal problem connected with their use is that of keeping and maintaining the monomeric plasticizers in the polymer as the polymer is used and ages.

In order to overcome the stiffening and bleeding problem of these monomerically plasticized compounds, rubbery polymeric plasticizers have been tried. Polymeric plasticizers have relatively high molecular weight, are solid and are much less volatile than monomeric plasticizers and have little or no tendency to bleed out of the polymer. For this reason, vinyl films plasticized with polymeric plasticizers have excellent non-bleeding characteristics. The principal polymeric plasticizers used are rubbery compounds such as copolymers of butadiene with one or more of acrylonitrile, methyl isopropenyl ketone, fumaric esters and long chain linear polyesters such as the polyester of an alkene gylcol and a dicarboxylic acid.

When polymeric plasticizers, particularly unsaturated diolefinic copolymers, are used to plasticize vinyl polymers, however, additional problems develop in that the compounds so plasticized are unstable and stiffen and discolor with prolonged exposure to sunlight and weather. Thus instead of stiffening because of loss of the plasticizer, they stiffen because of the action of light and weather on the unsaturated plasticizer molecule.

Attempts to stabilize such polymerically plasticized compounds against light and weather stiffening have proved very difficult. Many conventional additives are incompatible with either the polymeric plasticizers or the vinyl, vinylene, vinylidene compounds especially when they contain substantial proportions of hydrocarbon. Additives which are used to stabilize certain other film-forming materials have no effect on the polymerically plasticized vinyl and vinylidene halide compounds. Finally, it is even difficult to determine what causes the stiffening and discoloration and to evaluate what might overcome it.

It is thus one object of the subject invention to provide polymerically plasticized vinyl, vinylene, and vinylidene compounds which are light resistant and weather resistant. It is another object of this invention to provide a stabilizer for polymerically plasticized vinyl, vinylene, and vinylidene compounds which is compatible with both the compound and the polymeric plasticizer and which makes them resistant to stiffening and discoloration upon prolonged exposure to light and weather.

Another object of the present invention is to provide non-reactive, light-stable, non-volatile, and compatible stabilized plastic compositions suitable for forming sheets, films and other solid objects.

A further object is to provide a method of stabilizing polyvinyl halide and polyvinyl halide base compositions against deterioration because of heat and light particularly when the basic material is one plasticized at least in part by a rubbery copolymer.

Other objects and advantages will become apparent from the following detailed description of this invention.

In accordance with the present invention, we have discovered that from around 1 to 12 percent of a hydrazone within the formula noted below acts as a stabilizer for film-forming plastic compounds and when suitably dispersed or incorporated in above-mentioned polymeric base compositions inhibits discoloration and embrittlement on aging and exposure to light and weather.

Hydrazones contemplated by the subject invention are those within the general formula

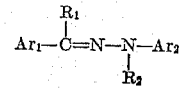

where $R_1$ is hydrogen or an alkyl radical of less than 12 aliphatic carbon atoms and preferably a member of the group consisting of hydrogen, methyl or ethyl, and $R_2$ is an alkyl radical or a cycloalkyl radical or an aralkyl group or combination of the two. $R_2$ is preferably an alkyl radical of less than 5 aliphatic carbon atoms and cannot be hydrogen. The carbons connecting $R_2$ to N must be alkyl. $Ar_1$ and $Ar_2$ are any substituted or unsubstituted aryl or cycloalkyl group including phenyl, cresyl, naphthyl or maleal or furfural. Substituents include halogens, especially chlorine, methyl hydroxyl, and trifluoro methyl radicals. Either $Ar_1$ or $Ar_2$ must be an aryl group, in other words, both $Ar_1$ and $Ar_2$ cannot be cycloalkyl groups. $R_1$, $R_2$, $Ar_1$ and $Ar_2$ should preferably be free from amine, amine sulfonic acid, nitro, aliphatic diol, peroxide and aceto groups.

Examples of compounds contemplated by the subject invention are benzal methyl phenyl hydrazone

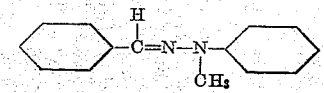

dichloro benzal ethyl phenyl hydrazone

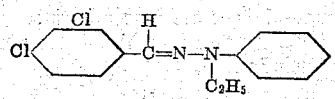

alpha naphthal methyl phenyl hydrazone

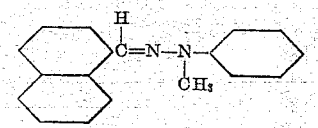

benzal methyl alpha naphthal hydrazone

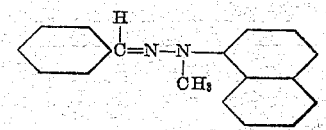

furfural methyl phenyl hydrazone

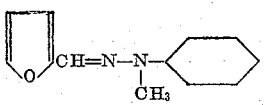

The aryl hydrazone stabilizers as above described are added along with the pigments, antioxidants, and other additives and milled into the polymer. They are non-reactive, light stable, and non-volatile. From 1 to 12 parts and preferably around 4 parts of the hydrazones are added to the film-forming compounds.

While these stabilizers are preferably used with polymerically plasticized polyvinyl chloride compounds, they can also be used with other film-forming compounds such as polyvinylidene chloride compounds, polyvinyl alcohol, vinyl chloride-cellulose acetate copolymers and other film-forming and sheet-forming compounds particularly those having a high polymeric ethylene derivative as a base thereof. They can also be used to stabilize other film-forming polymers such as chlorinated natural rubber, polyethylene, chloroprene, cellulose acetate, cellulose butyrate, styrene-butadiene copolymers, and the like but they are particularly outstanding in polyvinyl halide and polyvinylidene halide base compositions.

Suitable polymeric plasticizers for polyvinyl chloride and polyvinylidene chloride are rubbery polyesters, butadiene-acrylonitrile copolymers, butadiene-dialkylfumarate copolymers, methyl isopropenyl ketone-butadiene copolymers and mixtures thereof. The latter plasticizers are disclosed in copending application Serial No. 111,344, filed August 19, 1949, Patent No. 2,669,553, and assigned to the same assignee as the assignee hereof. The subject invention is contemplated for use with all linear rubbery polymers and copolymers which are compatible with vinyl, vinylene, and vinylidene compounds and which plasticize them.

Suitable rubbery plasticizers are long chain substituted hydrocarbons preferably with a molecular weight of over 10,000 and with a cyanide or ketone or carboxylic ester group for each 6 to 30 carbons or preferably 8 to 20 carbons (all carbons considered being those outside of carbonyl and cyanide groups) to render the same compatible with the vinyl, vinylene, and vinylidene compounds. Disregarding the ketone and cyanide groups, the plasticizers preferably consist of carbon and hydrogen atoms only or of carbon and hydrogen atoms and halogen atoms such as chlorine.

The preferred plasticizers include copolymers of at least one conjugated diolefinic compound of less than 7 carbon atoms such as the diolefines 1,3 butadiene 1,4 pentadiene, 2 methyl 1,3 butadiene, 2 chloro 1,3 butadiene, cyanoprene and the like with hardeners or solubilizing compounds such as acrylonitrile, methyl isopropenyl ketone and dialkyl fumarate. Terpolymers of a mono-olefine such as isobutylene with a conjugated diolefine of less than 7 carbon atoms such as isoprene or 2 methyl butadiene with the above carbonyl and/or cyano containing mono-olefines are also effective.

The following examples in which parts are by weight illustrate our invention:

*Example I*

Butadiene and methyl isopropenyl ketone in accordance with the following recipe:

| | Parts |
|---|---|
| Butadiene | 50 |
| Methyl isopropenyl ketone | 50 |
| Soap | 5 |
| Potassium persulfate | .5 |
| Mercaptan modifier | .25 |
| Water | 180 |

The above ingredients were mixed and maintained in autoclave with stirring for 8–14 hours at about 122° F. whereupon 70–80 percent of the polymerizable ingredients were converted to polymer. The latex thus obtained was cooled and removed from the autoclave for use according to Example II.

*Example II*

Fifty parts (dry weight) of the resultant latex was mixed with fifty parts (dry weight) of polyvinyl chloride latex. Two parts dry weight of Santowhite crystals (an alkylated phenol sulfide sold by the Monsanto Chemical Company) were also mixed in and the latex mixture was coagulated with the conventional acid-salt mixture as used in preparing GR–S rubber and as is well known in the art. The resultant crumb was filtered, dried and divided into separate portions. One portion was milled with lubricant and resin stabilizer and calendered to 4 mil thick, clear film samples. This was the control. Other portions were compounded in identical manner except that the amounts of benzal methyl phenyl hydrazone indicated in Table I below were also added. Identical samples of each film were exposed in a standard weatherometer and stiffness at 96 hours was noted. The results are shown in Table I.

TABLE I

| Compound | Parts BMPH (based on wt. of plasticizer plus P. V. C.) | Stiffness at 96 hours, kgm./sq. cm. |
|---|---|---|
| Control | 0 | 32,000 |
| #1 | 2 | 600 |
| #2 | 4 | 600 |
| #3 | 6 | 700 |
| #4 | 8 | 700 |
| #5 | 12 | 100 |

The control discolored badly after 96 hours whereas the other samples did not. The test was conducted in a National X–1–A accelerated weathering unit.

The bending modulus was tested by clamping short samples in horizontal clamps and noting the amount of downward bending against a scale. (This test is more fully described in the periodical "Rubber Chemistry and Technology," volume 24, Number 1, pages 1–17, January–March 1951, published under the auspices of the Division of Rubber Chemistry of the American Chemical Society.)

From these tests it is evident that from 2–12 parts of benzal methyl phenyl hydrazone greatly improve light and color stability.

*Example III*

A film was made up by copolymerizing butadiene and acrylonitrile in accordance with the following charge:

| | Parts |
|---|---|
| Butadiene | 55 |
| Acrylonitrile | 45 |
| Soap | 5 |
| Potassium persulfate | .5 |
| Mercaptan modifier | .25 |
| Water | 180 |

This is copolymerized as was the material of Example I at 122° F. for 8–14 hours to 70–80 percent conversion. The resulting latex is mixed with equal parts of solids by dry weight of polyvinyl chloride latex and the polymers salted out and the crumb dried and milled to film samples as in Example II.

From 2 to 12 parts of benzal methyl phenyl hydrazone were added as in Example II. The results were substantially the same as in Example II, showing that the hydrazone definitely stabilizes the polymer against light deterioration and stiffening.

In a similar manner, the hydrazones such as dichloro benzal ethyl phenyl hydrazone, alpha naphthal methyl phenyl hydrazone, benzal methyl alpha naphthal hydrazone and furfural methyl phenyl hydrazone protect polymerically plasticized compounds derived from ethylene.

The above noted hydrazones have different degrees of compatibility in different polymers so that some are somewhat more efficient in one polymer than in another. Furthermore, by varying the constituents in the hydrazone, the compatibility can be increased or decreased. In this way, a hydrazone tailored to each polymer can be developed.

Benzal methyl phenyl hydrazone is made by dissolving a mol of benzaldehyde in 300 cc. of a solvent consisting of ⅓ water and ⅔ methanol. A mol of phenyl methyl hydrazine is dissolved in 300 cc. of a solvent which is the same as above and the two solutions are mixed together at room temperature or below. Crystals of benzal methyl phenyl hydrazone are precipitated out. These crystals are recrystallized twice in isopropyl alcohol to purify them. It can also be obtained as benzal methyl phenyl hydrazone from the Eastman Kodak Co. of Rochester, N. Y. The other hydrazones can be made in a similar fashion. They also can be obtained from manufacturers such as the Eastman Kodak Co.

The hydrazones of the subject invention are suitable for light stabilization of all film forming compounds derived from ethylene and substituted ethylene compounds, particularly halogen substituted. This includes vinyl compounds formed from the monovalent radical —CH=CH$_2$, vinylene compounds formed from the divalent radical —CH=CH—, vinylidene compounds formed from the divalent radical H$_2$C=C=, and substituted compounds formed from any of the above, particularly halogen substituted compounds. They they protect polymerically plasticized polyvinyl, polyvinylidene, and polyvinylene chloride films from light stiffening. They also somewhat improve polymers containing tetra substituted ethylene compounds such as dichlorodifluoroethylene films although this material in itself is exceptional.

They also have some stabilizing activity in other film-forming polymers such as polyethylene, copolymers containing a conjugated diolefine of less than seven aliphatic carbon atoms such as butadiene-styrene, butadiene-acrylonitrile, and isoprene-styrene systems, chlorinated conjugated diolefines such as chloroprene. The term "polymer" is used herein in the generic sense to include polymers, copolymers, terpolymers, and the like.

In addition, the stabilizers of the subject invention can be used with heterogeneous copolymer mixtures such as styrene-acrylonitrile with butadiene-acrylonitrile, styrene-acrylonitrile with butadiene-methyl isopropenyl ketone, styrene-methyl cinnamate with butadiene-acrylonitrile and the like.

The polymeric plasticizers as noted are rubbery copolymers of conjugated diolefines and iso-olefines with stiffeners such as methyl isopropenyl ketone, acrylonitrile, and the like which are compatible with the ethylene derived compounds. These rubbery plasticizers may be compounded with accelerators and vulcanizing agents so that they are curable as desired. When the polymeric plasticizer is cured, it tends to become stiffer and more stable. The subject invention applies to the stabilization of compounds containing both curable and uncurable rubbery plasticizers.

The hydrazones of the subject invention can be added to both clear and pigmented films and are beneficial in each. In addition to preventing deterioration upon prolonged exposure to light they also serve as antioxidants and resin stabilizers by acting as free radical scavengers. From .5 up to 1 up to 10 or 12 parts of the hydrazones can be added to the film forming compound to give a beneficial stabilizing effect. Around 3 to 4 or 6 parts are preferably added. The stabilizer is less effective in concentrations below 2 parts although as low as .3 part has been found to have a beneficial effect. Concentrations in excess of 8 parts provide diminishing benefits for the additional stabilizer added and at around 10 to 12 parts the stabilizer tends to become incompatible with the compound.

A synergistic effect has also been observed between the hydrazones of the subject invention and certain dithiophosphate salts such as nickel di-isopropyl dithiophosphate, and nickel diisobutyl dithiophosphate. Other nickelic and cobaltic dithiophosphates with hydrocarbon substituent group consisting of alkyl, alkylene, aryl-alkyl, and aryl-alkylene groups and preferably the branched chain derivatives for the shorter chain length compounds, of less than 14 aliphatic carbon atoms have a similar effect. Ferric and cupric dithiophosphates may also be employed although the nickelic and cobaltic dithiophosphates are preferable.

Around one part of the dithiophosphate salt is added for each four parts of the hydrazone. Since the dithiophosphates tend to impart color to the polymer they cannot be added to the polymer for use in clear sheets in much over 2 parts per hundred. Several of the above noted nickel dithiophosphates are available from the Monsanto Chemical Company of St. Louis, Missouri.

If desired, dithiophosphate salts can be used by themselves for stabilizing ethylene compounds and other film-forming polymers. From .2 up to 1.5 or 2 percent of the salts by weight of the ethylene compounds may be added.

Although several embodiments of the invention have been herein shown and described, it will be understood that in accordance with the provisions of the patent statutes, numerous modifications of the examples shown may be resorted to without departing from the spirit of the invention.

What we claim is:

1. A film-forming composition selected from the group consisting of (a) polymers of a mono-olefin containing recurring units of the general formula

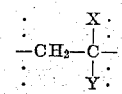

wherein X and Y are selected from a member of the group consisting of hydrogen and halogen, (b) cellulosic ester polymers selected from a member of the group consisting of cellulose acetate and cellulose butyrate, (c) synthetic polymers of a conjugated diolefine of less than seven aliphatic carbon atoms and (d) chlorinated natural rubber containing .5 to 12 percent by weight of a hydrazone having the general formula:

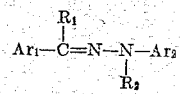

where R$_1$ is a radical selected from the group consisting of hydrogen and an alkyl radical of less than 12 aliphatic carbon atoms, R$_2$ is an alkyl radical, and Ar$_1$ and Ar$_2$ are selected from the group consisting of aryl and fural radicals, at least one of Ar$_1$ and Ar$_2$ being an aryl radical.

2. A film-forming composition comprising a polymer of a mono-olefin containing recurring units of the general formula

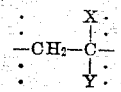

wherein X and Y are selected from a member of the group consisting of hydrogen and halogen containing .5 to 12 percent of a hydrazone having the general formula:

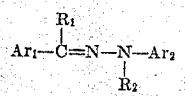

where R$_1$ is a radical selected from the group consisting of hydrogen and an alkyl radical of less than 12 aliphatic carbon atoms, R$_2$ is an alkyl radical, and Ar$_1$ and Ar$_2$ are selected from the group consisting of aryl and fural radicals, at least one of Ar$_1$ and Ar$_2$ being an aryl radical.

3. The composition of claim 2 in which the hydrazone is benzal methyl phenyl hydrazone.

4. A composition of polyvinyl chloride and a rubbery polymeric plasticizer comprising a copolymer of a conjugated diolefin having less than seven aliphatic carbon atoms with a mono-olefin selected from a member of the group consisting of acrylonitrile and methyl isopropenyl ketone containing .5 to 12 percent by weight of a hydrazone with the general formula:

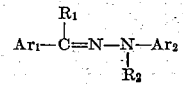

where $R_1$ is a radical selected from the group consisting of hydrogen and an alkyl radical of less than 12 aliphatic carbon atoms, $R_2$ is an alkyl radical, and $Ar_1$ and $Ar_2$ are selected from the group consisting of aryl and fural radicals, at least one of $Ar_1$ and $Ar_2$ being an aryl radical.

5. A composition of a polyvinyl chloride-polyvinylidene chloride copolymer and a rubbery polymeric plasticizer comprising a copolymer of a conjugated diolefin having less than seven aliphatic carbon atoms with a mono-olefin selected from a member of the group consisting of acrylonitrile and methyl isopropenyl ketone containing .5 to 12 percent by weight of a hydrazone with the general formula:

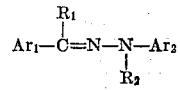

where $R_1$ is a radical selected from the group consisting of hydrogen and an alkyl radical of less than 12 aliphatic carbon atoms, $R_2$ is an alkyl radical, and $Ar_1$ and $Ar_2$ are selected from the group consisting of aryl and fural radicals, at least one of $Ar_1$ and $Ar_2$ being an aryl radical.

6. A film-forming composition comprising a polymer of a mono-olefin containing recurring units of the general formula

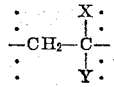

wherein X and Y are selected from a member of the group consisting of hydrogen and halogen containing one part of a dithiophosphate salt selected from the group consisting of cobaltic, cupric, ferric, and nickelic salts having hydrocarbon substituents of from 3 to 14 carbon atoms for every four parts of a hydrazone of the general formula:

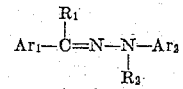

where $R_1$ is a radical selected from the group consisting of hydrogen and an alkyl radical of less than 12 aliphatic carbon atoms, $R_2$ is an alkyl radical, and $Ar_1$ and $Ar_2$ are selected from the group consisting of aryl and fural radicals, at least one of $Ar_1$ and $Ar_2$ being an aryl radical, said compound containing at least .2 percent by weight of a dithiophosphate salt.

7. A composition of polyvinyl chloride and a rubbery polymeric plasticizer comprising a copolymer of a conjugated diolefin having less than seven aliphatic carbon atoms with a mono-olefin selected from a member of the group consisting of acrylonitrile and methyl isopropenyl ketone containing one part of a dithiophosphate salt selected from the group consisting of cobaltic, cupric, ferric, and nickelic salts having hydrocarbon substituents of from 3 to 14 carbon atoms for every four parts of a hydrazone of the general formula:

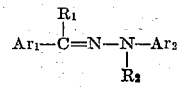

where $R_1$ is a radical selected from the group consisting of hydrogen and an alkyl radical of less than 12 aliphatic carbon atoms, $R_2$ is an alkyl radical, and $Ar_1$ and $Ar_2$ are selected from the group consisting of aryl and fural radicals, at least one of $Ar_1$ and $Ar_2$ being an aryl radical, said compound containing at least .2 percent by weight of a dithiophosphate salt.

8. The composition of claim 7 in which the dithiophosphate salt is nickel diisopropyl dithiophosphate and the hydrazone is benzal methyl phenyl hydrazone.

9. A film-forming composition selected from the group consisting of (a) a polymer of a mono-olefin containing recurring units of the general formula

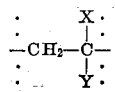

wherein X and Y are selected from a member of the group consisting of hydrogen and halogen (b) cellulosic ester polymers selected from a member of the group consisting of cellulose acetate and cellulose butyrate, (c) polymers of a conjugated diolefine of less than seven aliphatic carbon atoms and (d) chlorinated natural rubber containing .5 to 12 percent by weight of furfural methyl phenyl hydrazone.

10. A film-forming composition selected from the group consisting of (a) a polymer of a mono-olefin containing recurring units of the general formula

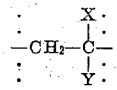

wherein X and Y are selected from a member of the group consisting of hydrogen and halogen, (b) cellulosic ester polymers selected from a member of the group consisting of cellulose acetate and cellulose butyrate, (c) polymers of a conjugated diolefine of less than seven aliphatic carbon atoms and (d) chlorinated natural rubber containing .5 to 12 percent by weight of benzal methyl alpha napthal hydrazone.

References Cited in the file of this patent

UNITED STATES PATENTS

| | | |
|---|---|---|
| 2,018,643 | Williams et al. | Oct. 22, 1935 |
| 2,552,570 | McNab et al. | May 15, 1951 |
| 2,691,642 | Faulkner | Oct. 12, 1954 |